(12) United States Patent
Matsushita

(10) Patent No.: US 11,150,333 B2
(45) Date of Patent: Oct. 19, 2021

(54) OBJECT SENSING APPARATUS AND OBJECT SENSING METHOD

(71) Applicant: DENSO CORPORATION, Kariya (JP)

(72) Inventor: Fumihiko Matsushita, Kariya (JP)

(73) Assignee: DENSO CORPORATION, Kariya (JP)

( * ) Notice: Subject to any disclaimer, the term of this patent is extended or adjusted under 35 U.S.C. 154(b) by 495 days.

(21) Appl. No.: 16/301,598

(22) PCT Filed: May 11, 2017

(86) PCT No.: PCT/JP2017/017948
§ 371 (c)(1),
(2) Date: Nov. 14, 2018

(87) PCT Pub. No.: WO2017/199863
PCT Pub. Date: Nov. 23, 2017

(65) Prior Publication Data
US 2019/0293773 A1    Sep. 26, 2019

(30) Foreign Application Priority Data

May 19, 2016 (JP) .............................. JP2016-100602

(51) Int. Cl.
*G01S 7/52* (2006.01)
*G01S 15/08* (2006.01)
(Continued)

(52) U.S. Cl.
CPC .......... *G01S 7/52015* (2013.01); *B60R 21/00* (2013.01); *G01S 7/526* (2013.01);
(Continued)

(58) Field of Classification Search
CPC ...... G01S 7/52015; G01S 7/526; G01S 15/93; G01S 15/08; G01S 15/46; G01S 15/931;
(Continued)

(56) References Cited

U.S. PATENT DOCUMENTS

2019/0293773 A1* 9/2019 Matsushita ............. B60R 21/00

FOREIGN PATENT DOCUMENTS

CN         109154648 A  *  1/2019  ........... G01S 15/931
DE   10 2004 038 496 A1    3/2006
(Continued)

*Primary Examiner* — Daniel Pihulic
(74) *Attorney, Agent, or Firm* — Maschoff Brennan

(57) ABSTRACT

An object sensing apparatus includes an object sensing unit to sense an object using a direct wave, being a reflected wave received by a sensor having transmitted a probing wave among a plurality of ultrasonic sensors, and an indirect wave, being a reflected wave received by a sensor different from the sensor having transmitted the probing wave among the ultrasonic sensors, and a temperature change detection unit to detect a predetermined temperature change state where temperature change of a predetermined value or more has occurred or a possibility of the temperature change occurs in an ambient temperature of the moving object. When the predetermined temperature change state is detected by the temperature change detection unit, the object sensing unit performs sensing suppression control not to sense the object using the indirect wave or to make it difficult to sense the object using the indirect wave.

7 Claims, 5 Drawing Sheets

(51) Int. Cl.
| | |
|---|---|
| *G01S 15/46* | (2006.01) |
| *G01S 15/93* | (2020.01) |
| *G01S 15/931* | (2020.01) |
| *B60R 21/00* | (2006.01) |
| *G01S 7/526* | (2006.01) |
| *B60Q 9/00* | (2006.01) |
| *B60W 30/09* | (2012.01) |

(52) U.S. Cl.
CPC .............. *G01S 15/08* (2013.01); *G01S 15/46* (2013.01); *G01S 15/93* (2013.01); *G01S 15/931* (2013.01); *B60Q 9/008* (2013.01); *B60W 30/09* (2013.01); *B60W 2420/54* (2013.01)

(58) Field of Classification Search
CPC ........ B60R 21/00; B60Q 9/008; B60W 30/09; B60W 2420/54
See application file for complete search history.

(56) References Cited

FOREIGN PATENT DOCUMENTS

| | | | | |
|---|---|---|---|---|
| DE | 10 2012 020 413 A1 | | 4/2014 | |
| DE | 112017002538 T5 | * | 2/2019 | ............. B60R 21/00 |
| JP | 4972108 B2 | | 7/2012 | |
| JP | 2017207393 A | * | 11/2017 | ............. G01S 15/08 |
| JP | 6638554 B2 | * | 1/2020 | ........... G01S 15/931 |
| WO | WO-2017199863 A1 | * | 11/2017 | ......... G01S 7/52015 |

\* cited by examiner

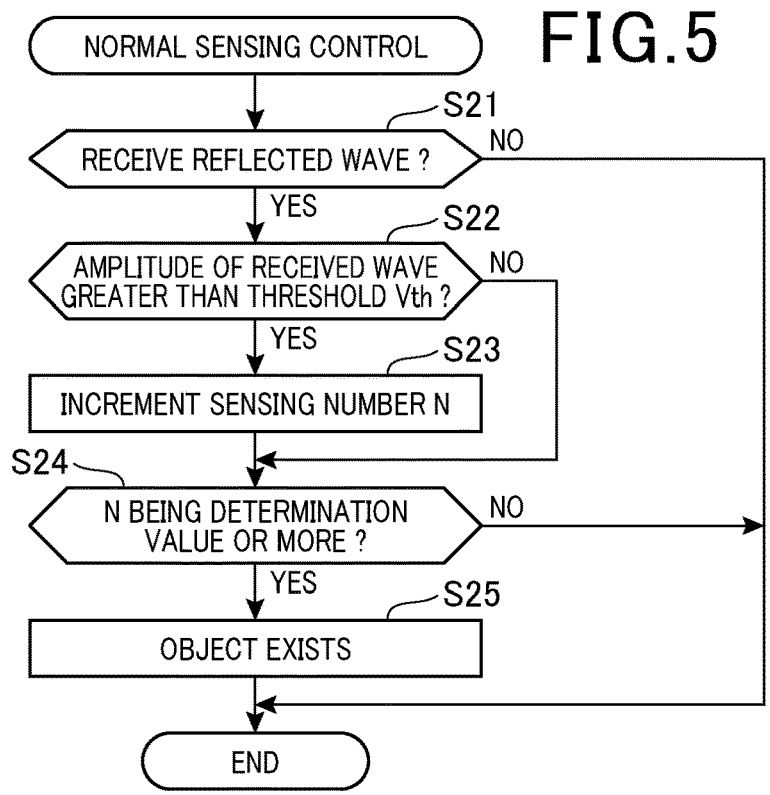
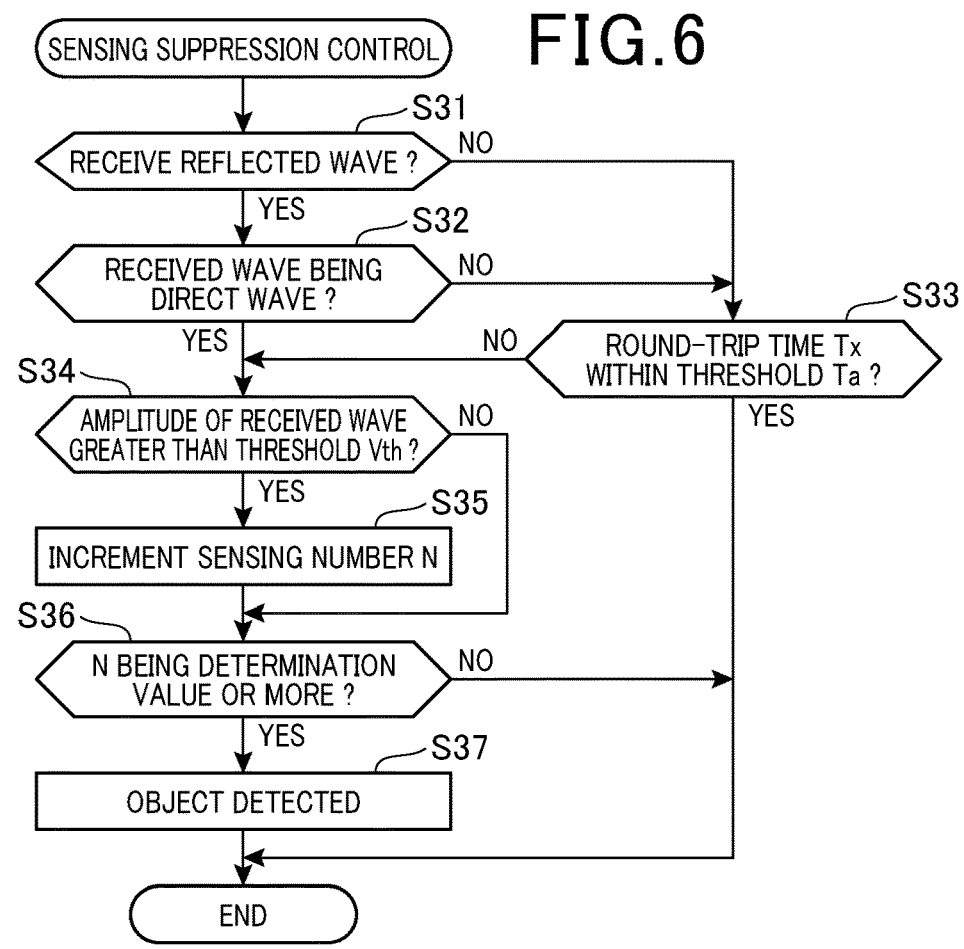

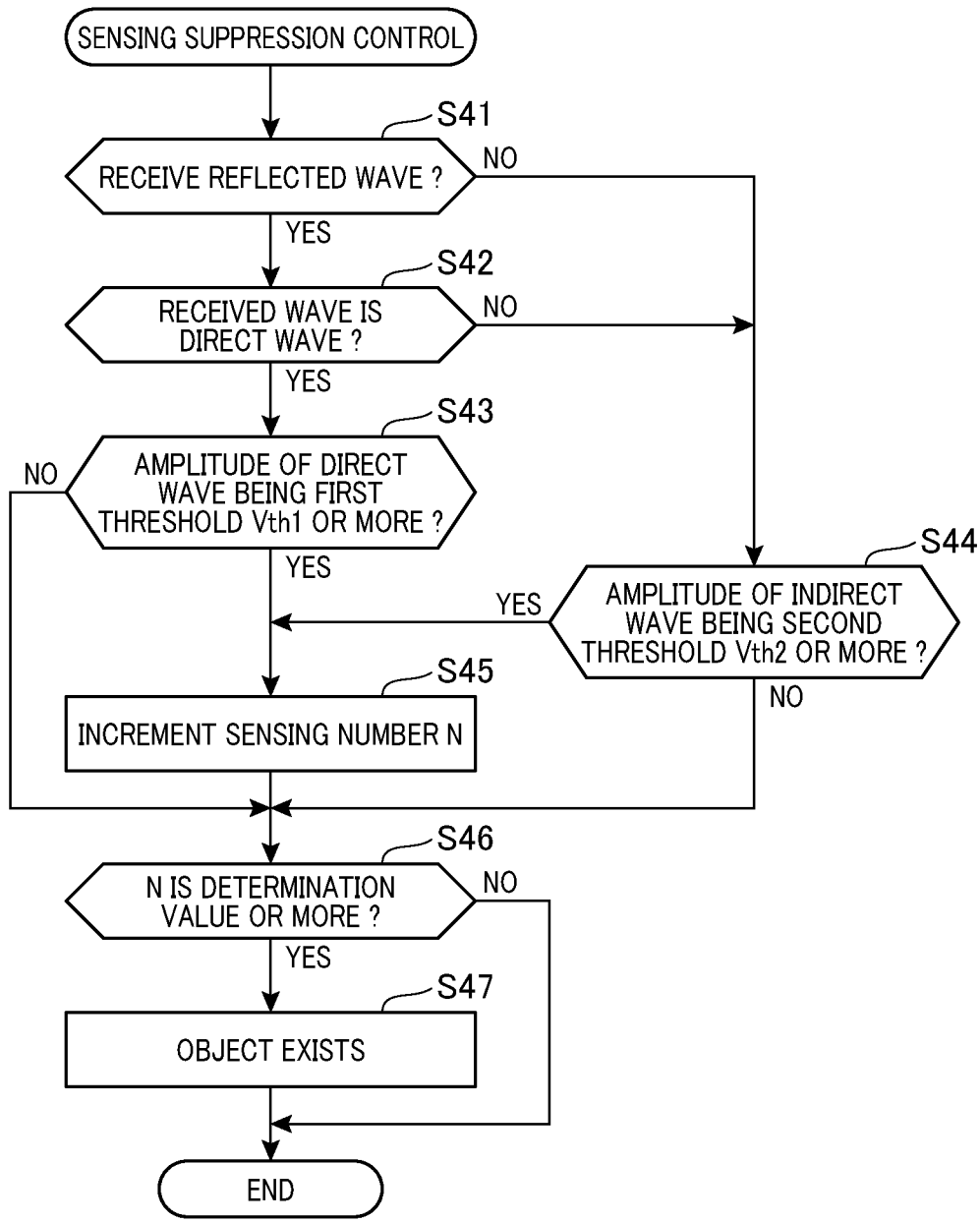

OBJECT SENSING APPARATUS AND OBJECT SENSING METHOD

CROSS-REFERENCE TO RELATED APPLICATION

This application is a national stage application of PCT Application No. PCT/JP2017/017948, filed on May 11, 2017, which is based on Japanese Patent Application No. 2016-100602, filed on May 19, 2016, the entire contents of which are incorporated herein by reference.

TECHNICAL FIELD

The present disclosure relates to an object sensing apparatus and an object sensing method that sense an object in the surroundings.

BACKGROUND ART

It is conventionally known that ultrasonic sensors are mounted to a moving object to sense an object in the surroundings of the moving object and also to perform various types of control to improve driving safety of the moving object, such as actuation and alarm of a braking device, for example, on the basis of the sensing result.

PTL 1 discloses an ultrasonic sensor that senses a temperature of a structure where a microphone to transmit and receive an ultrasonic wave is arranged and an atmospheric temperature around the microphone to control sensing start time from transmitting of an ultrasonic wave by the microphone in accordance with the sensed temperatures to start sensing an object on the basis of an ultrasonic received signal received by the microphone. Such control delays the sensing start time when snow or frost is prone to be attached to a surface of the microphone to avoid false sensing.

CITATION LIST

Patent Literature

[PTL 1] JP 4972108 B

SUMMARY OF THE INVENTION

When a moving object enters a space isolated from outside or a space prone to be filled with heat, such as inside a garage and inside a tunnel, the temperature surrounding the moving object and the ultrasonic sensor sometimes changes greatly. In an environment where such temperature change occurs, it is found that an object is sometimes falsely sensed by the ultrasonic sensor although there is actually no object present. When such false sensing occurs, there is a concern that various types of control to improve driving safety of the moving object cannot be appropriately performed.

The present disclosure has been made in view of such problems, and it is an object thereof to provide an object sensing apparatus and an object sensing method that are capable of suppressing false sensing of an object due to the influence of environmental change around the moving object.

The present disclosure employs the following means to solve the above problems.

An aspect of the present disclosure relates to an object sensing apparatus applicable to a moving object including a plurality of ultrasonic sensors to transmit a probing wave and to receive a reflected wave of the probing wave. The object sensing apparatus includes: an object sensing unit which senses the object using a direct wave, being a reflected wave received by the sensor having transmitted the probing wave among the ultrasonic sensors, and an indirect wave, being a reflected wave received by a sensor different from the sensor having transmitted the probing wave among the ultrasonic sensors; and a temperature change detection unit which detects a predetermined temperature change state where temperature change of a predetermined value or more has occurred or a possibility of the temperature change occurs in an ambient temperature of the moving object, wherein the object sensing unit performs, when the predetermined temperature change state is detected by the temperature change detection unit, sensing suppression control not to sense the object using the indirect wave or to make it difficult to sense the object using the indirect wave.

When temperature change of a predetermined value or more has occurred or a possibility of the temperature change occurs in the ambient temperature of the moving object, a phenomenon sometimes occurs that an ultrasonic sensor receives an indirect wave not produced by reflection by the object around the moving object. In view of this point, when temperature change of a predetermined value or more has occurred or a possibility of the temperature change occurs in the ambient temperature of the moving object, the present disclosure is configured not to sense the object using the indirect wave or to make it difficult to sense the object using the indirect wave. Such a configuration allows limitation of sensing an object using an indirect wave when the reliability of the indirect wave decreases due to influence of temperature change, thereby suppressing false sensing of an object.

BRIEF DESCRIPTION OF DRAWINGS

The present disclosure will be clearer on the above objects, other objects, characteristics, and advantages from the detailed description below with reference to the appended drawings. The drawings are as follows:

FIG. 5 is a flowchart illustrating a processing procedure of normal sensing control;

FIG. 6 is a flowchart illustrating a processing procedure of sensing suppression control;

FIG. 7 is a flowchart illustrating a processing procedure of sensing suppression control in a second embodiment.

DESCRIPTION OF EMBODIMENTS

Figure 1:
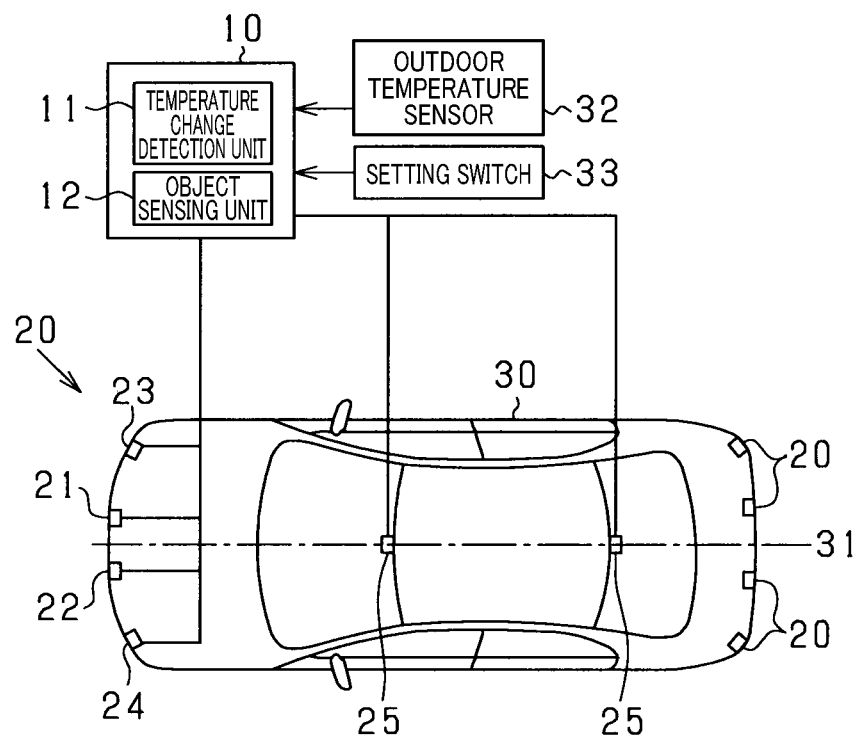
FIG. 1 is a diagram illustrating a schematic configuration of an object sensing system of a vehicle.

Embodiments are described below with reference to the drawings. In each embodiment, an identical reference sign is given to parts identical or equivalent to each other in the drawings and the parts with identical reference sign incorporate the description thereof.

First Embodiment

An object sensing apparatus in the present embodiment is a vehicle-mounted device mounted to a vehicle as a moving object and senses an object (e.g., another vehicle, a road structure, etc.) around the vehicle using ultrasonic sensors as object sensing sensors. A description is firstly given to a schematic configuration of an object sensing system of a vehicle according to the present embodiment with reference to FIG. 1.

In FIG. 1, ultrasonic sensors 20 are sensors that transmit an ultrasonic wave as a probing wave and receive a reflected wave from the object. In the present embodiment, four sensors are attached to bumpers at the front and the rear of a vehicle 30 aligned parallel with a vehicle width at a predetermined interval. For example, the front bumper is provided with, as the ultrasonic sensors 20, two center sensors of a first sensor 21 and a second sensor 22 respectively attached near a center line 31 of the vehicle width in symmetrical positions to the center line 31 and two corner sensors 23 and 24 attached respectively to a left corner and a right corner of the vehicle 30.

To the vehicle 30, vehicle-mounted cameras 25 are mounted that have a capture region around the vehicle. The vehicle-mounted cameras 25 are configured with monocular cameras or stereo cameras of, for example, CCD cameras, CMOS image sensors, near-infrared cameras, and the like. The vehicle-mounted cameras 25 are attached respectively to the front and the rear of the vehicle 30 at a predetermined height in the center of the vehicle width and take a picture of a region extending forward and rearward of the vehicle in a predetermined angular range from an aerial perspective.

An ECU 10 as the object sensing apparatus is a computer mainly composed of a microcomputer configured with a CPU, various memories (ROM, RAM, etc.), and the like and realizes each function by causing the CPU to execute a program installed in the ROM. The ROM is equivalent to a computer readable storage medium functioning as a non-transitory tangible storage medium. The ECU 10 is connected to the ultrasonic sensors 20 and senses an object around the vehicle on the basis of object information obtained from the ultrasonic sensors 20. On the basis of the object sensing result from the ultrasonic sensors 20, the ECU 10 issues an alarm by a warning sound to a driver of the vehicle 30 not to contact the vehicle 30 with the object or performs various types of control, such as braking control and steering control to avoid contact with the object.

In the object sensing, specifically, the ECU 10 outputs a control signal to the ultrasonic sensors 20 to issue a command to transmit an ultrasonic wave from the ultrasonic sensors 20 on a predetermined transmission cycle (e.g., at a several hundred millisecond interval). The ECU 10 also calculates a distance to the object on the basis of round-trip time Tx, which is time from transmitting to receiving by each ultrasonic sensor 20.

More in detail, the ultrasonic sensor 20 receives a reflected wave of the probing wave transmitted by itself as a direct wave to obtain its round-trip time as distance information. The ultrasonic sensor 20 also receives a reflected wave of a probing wave transmitted by a sensor different from the sensor having transmitted the probing wave as an indirect wave to obtain its round-trip time as distance information. The ECU 10 senses the presence and the direction of an object by distance information obtained from the direct wave and distance information obtained from the indirect wave. The use of the distance information obtained from the indirect wave allows an increase in object sensing accuracy in the area between the sensors. By using the distance information obtained from the direct wave and the distance information obtained from the indirect wave, a relative position (coordinates) of the object to the vehicle 30 is calculated by the principle of the triangulation.

Figure 2:
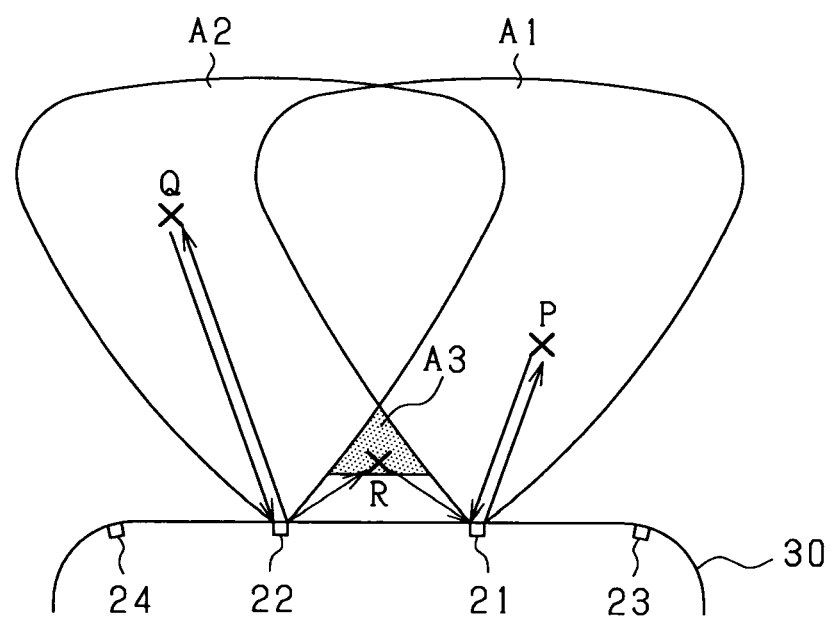
FIG. 2 is a schematic diagram of sensing regions of ultrasonic sensors.

FIG. 2 illustrates a schematic diagram of a sensing region A1 of the first sensor 21 and a sensing region A2 of the second sensor 22. When there is an object in a position P in the sensing region A1 of the first sensor 21, the probing wave transmitted from the first sensor 21 is received by the first sensor 21 itself as a direct wave. When there is an object in a position Q in the sensing region A2 of the second sensor 22, the probing wave transmitted from the second sensor 22 is received by the second sensor 22 itself as a direct wave. Meanwhile, in the front of an intermediate position between the first sensor 21 and the second sensor 22, there is a region A3 near the vehicle 30 where an object cannot be sensed by a direct wave but can be sensed by an indirect wave. When there is an object in a position R in the region A3, the probing wave transmitted from the second sensor 22 is received by the first sensor 21 as an indirect wave to sense the object.

Figure 3:
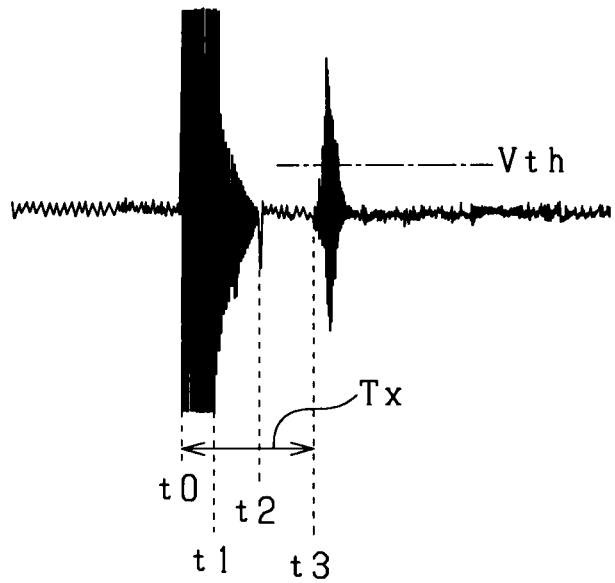
FIG. 3 is a diagram illustrating an ultrasonic detection signal inputted to a receiving circuit of the ultrasonic sensor.

FIG. 3 illustrates an ultrasonic detection signal inputted to the receiving circuit of the ultrasonic sensor 20.

The ultrasonic sensor 20 transmits an ultrasonic wave at a predetermined frequency from a time t0 to a time t1 in accordance with a control command transmitted from the ECU 10.

At that point, a transmitted signal is inputted to the receiving circuit from the time t0 to the time t1. To the receiving circuit receives reverberation from the time t1 to a time t2. When the ultrasonic wave thus transmitted is reflected by the object, the reflected wave is received by the ultrasonic sensor 20 at a time t3 in accordance with the distance from the object and its received signal is inputted to the received circuit. A longer distance from the object causes the received signal to appear at a later time and the round-trip time Tx to be longer. The ECU 10 compares a voltage level of amplitude of the received signal with a threshold Vth and determines that, when the amplitude of the received signal is greater than the threshold Vth, an object is sensed. In the case of the indirect wave, the transmitted signal in FIG. 3 is a signal based on the ultrasonic wave transmitted from an adjacent sensor.

In addition, the ECU 10 is connected to: various sensors as vehicle sensors, such as an engine speed sensor, a vehicle speed sensor, and an outdoor temperature sensor 32 to detect the temperature around the vehicle 30; a setting switch 33 for a driver to input various settings; and the like. Examples of the outdoor temperature sensor 32 include an outdoor temperature sensor for air conditioning control used for control of an air conditioning apparatus, a temperature sensor built in the ultrasonic sensor 20, and the like.

In this situation, when the vehicle 30 enters a space isolated from outside, such as a garage, a tunnel, and an indoor parking lot, or a space prone to be filled with the heat and the exhaust heat of the engine, the temperature surrounding the vehicle 30 and the ultrasonic sensors 20 sometimes changes greatly. In an environment where such temperature change occurs, a phenomenon sometimes occurs that the ultrasonic sensor 20 receives an indirect wave although there is actually no object present and it can be seen that false sensing of an object may occur. Specifically, it is found that the region A3 illustrated in FIG. 2 is a region which can not sense objects by a direct wave but can sense it by an indirect wave, whereas the region has a possibility of being determined that, when rapid temperature change occurs around the ultrasonic sensor 20, there is an object even though there is actually no object. Such an event is assumed to be partly because, when rapid temperature change (e.g., a temperature raise of several ° C. or more) around the vehicle 30, the probing wave transmitted from the ultrasonic sensor 20 is directly received by a sensor adjacent to the sensor having transmitted it.

In view of such an event, the ECU 10 performs control not to sense an object using indirect wave as sensing suppression control when temperature change of a predetermined value or more has occurred or a possibility of the temperature change occurs in the ambient temperature of the vehicle 30 (hereinafter, referred to as "predetermined temperature change state"). Particularly in the present embodiment, a short distance region in a predetermined distance from the vehicle 30 is subjected to control not to sense an object using an indirect wave. Use of an indirect wave is thus limited when reliability of the indirect wave decreases. Meanwhile, regions farther from the short distance region are subjected to object sensing using an indirect wave together with a direct wave to secure the object sensing accuracy in the areas between the sensors.

Specifically, as illustrated in FIG. 1, the ECU 10 includes a temperature change detection unit 11 and an object sensing unit 12. The temperature change detection unit 11 obtains data of an outdoor temperature θ detected by the outdoor temperature sensor 32 at a predetermined sampling interval to detect a predetermined temperature change state on the basis of temporal change of the outdoor temperature θ thus obtained. In the present embodiment, whether or not an increase Δθ of the outdoor temperature θ in unit time ΔTs (e.g., from 0.1 second to several seconds) is a threshold θth or more (e.g., from 5° C. to 10° C. or more) is determined to detect whether temperature change of a predetermined value or more has occurred in the ambient temperature of the vehicle 30. The temperature change detection unit 11 outputs the detection result as outside temperature information to the object sensing unit 12.

The object sensing unit 12 performs control to sense an object by limiting use of an indirect wave on the basis of the outside temperature information inputted from the temperature change detection unit 11. Specifically, when the outside temperature information thus inputted is not information indicating the predetermined temperature change state, the object sensing unit 12 performs normal sensing control to sense an object using the distance information obtained from the direct wave and the distance information obtained from the indirect wave. In contrast, when the outside temperature information thus inputted is information indicating the predetermined temperature change state, the object sensing unit 12 performs sensing suppression control to sense an object by invalidating the distance information obtained from the indirect wave having the round-trip time Tx within a threshold Ta to use only valid information among the distance information obtained from the direct wave and the distance information obtained from the indirect wave. The threshold Ta is determined on the basis of a length between the ultrasonic sensors 20, and in the present embodiment, is set at reflection time in the region A3.

Figure 4:
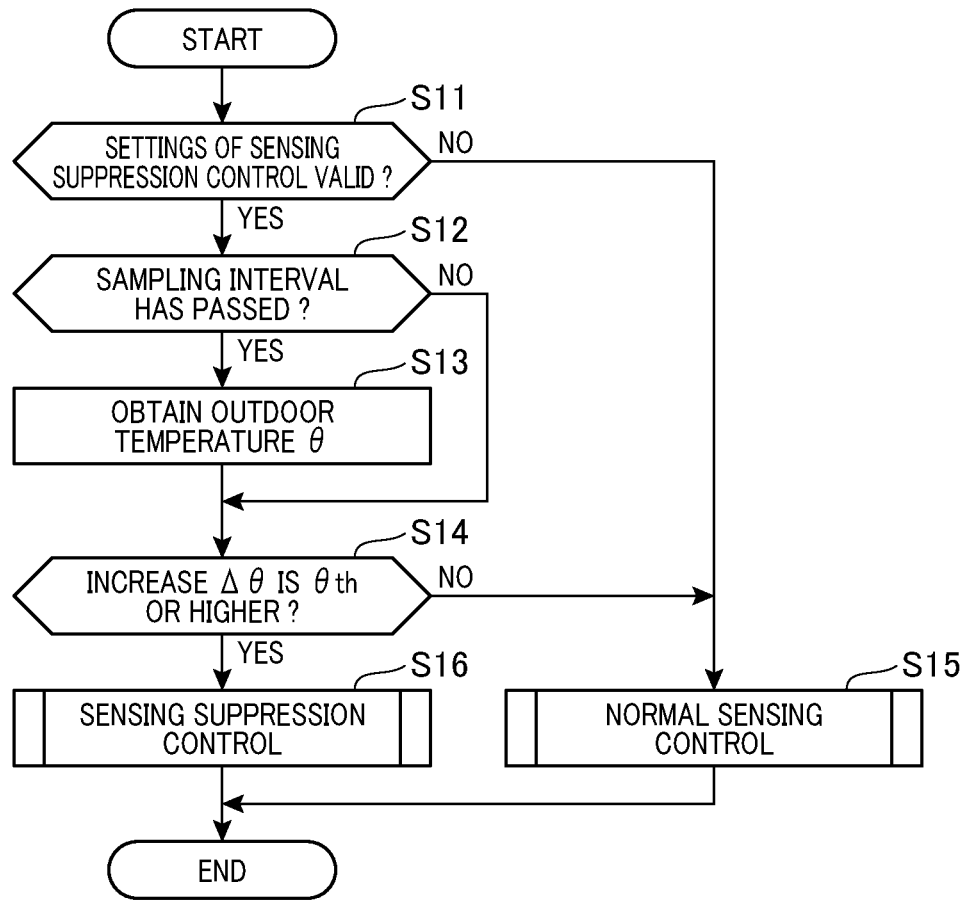
FIG. 4 is a flowchart illustrating a processing procedure of object sensing control.

The object sensing control in the present embodiment will now be described with reference to the flowcharts in FIGS. 4 to 6. FIG. 4 is a flowchart illustrating a main routine of the object sensing control. This process is executed by the ECU 10 for each predetermined cycle.

In FIG. 4, at step S11, whether or not the settings of the sensing suppression control are valid is determined. In the present system, an operator can switch whether or not to execute the sensing suppression control by the setting switch 33. If the settings of the sensing suppression control are invalidated, the process continues to step S15 to perform the normal sensing control. In contrast, when the settings of the sensing suppression control are valid, the process continues to step S12 to determine whether or not the sampling interval (e.g., several msec) of the data of the outdoor temperature θ detected by the outdoor temperature sensor 32 has passed. If the sampling interval has passed, the process continues to step S13 to obtain the data of the outdoor temperature θ.

At following step S14, on the basis of the temporal change in the outdoor temperature θ, whether or not temperature change of a predetermined value or more has occurred in the ambient temperature of the vehicle 30 is determined. In this situation, whether or not the increase Δθ of the outdoor temperature θ in the unit time ΔTs is the threshold θth or more is determined. If the increase Δθ is less than the threshold θth, the process continues to step S15 to perform the normal sensing control. In contrast, if the increase Δθ is the threshold θth or more, the process continues to step S16 to perform the sensing suppression control. After that, the present routine is ended.

Normal sensing control will now be described with reference to the flowchart in FIG. 5. In FIG. 5, at step S21, whether or not a reflected wave is received by the ultrasonic sensor 20 is determined. The reflected wave at this step includes a direct wave and an indirect wave. At following step S22, whether or not the amplitude of the reflected wave thus received is greater than the threshold Vth is determined. On condition that the amplitude is greater than the threshold Vth, the process continues to step S23 to increment an object sensing number N. The sensing number N is set for each target, and in this situation, the sensing number N of a target subjected to the sensing at this time is incremented.

At following step S24, whether or not the sensing number N is a determination value or more is determined. If the sensing number N is less than the determination value, the current iteration of the present routine is terminated. In contrast, if the sensing number N is the determination value or more, the process continues to step S25 to make final determination that there is an object and generate object sensing information indicating sensing of an object. The ECU 10 performs driving assistance control of the vehicle 30 on the basis of the object sensing information.

The sensing suppression control will now be described with reference to the flowchart in FIG. 6. In FIG. 6, at step S31, whether or not a reflected wave of either a direct wave or an indirect wave is received by the ultrasonic sensor 20 is determined. If the reflected wave is received, the process continues to step S32 to determine whether the received wave is a direct wave or an indirect wave. The ECU 10 specifies the sensor having transmitted the probing wave on the basis of the control command and also specifies the sensor having received the reflected wave to determine whether the received wave is a direct wave or an indirect wave on the basis of the agreement/disagreement of them.

If the received wave is a direct wave, the process continues to step S34 and later, and at steps S34 to S37, the process same as that at steps S22 to S25 in FIG. 5 is executed. In contrast, if the received wave is determined as an indirect wave at step S32, the process continues to step S33 to determine whether or not the round-trip time Tx of the indirect wave received at this time is within the threshold Ta. The present routine is directly ended if the round-trip time Tx is within the threshold Ta, and the process at steps S34 to S37 is executed if the round-trip time Tx is longer than the threshold Ta. In such a manner, the indirect wave having the distance information with round-trip time Tx longer than the threshold Ta is used to sense an object. Meanwhile, the indirect wave having the distance information with the round-trip time Tx of the threshold Ta or less is abandoned.

According to the present embodiment described in detail above, the following advantageous effects are obtained.

When temperature change of a predetermined value or more is detected to have occurred in the ambient temperature of the vehicle 30, this embodiment is configured to perform control not to sense an object using an indirect wave as the sensing suppression control. When temperature change has occurred around the vehicle 30, a phenomenon sometimes occurs that the ultrasonic sensor 20 receives an indirect wave not produced by reflection by the object around the vehicle. In view of this point, the above configuration limits use of an indirect wave when the reliability of the indirect wave decreases due to influence of the temperature change. This allows suppression of false sensing of an object.

This embodiment is configured to perform the sensing suppression control for the short distance region within the predetermined distance from the vehicle 30. It is found that the phenomenon of receiving an indirect wave by the ultrasonic sensor 20 although there is no object with the temperature change around the vehicle 30 occurs in a short distance region from the vehicle 30. In view of this point, the above configuration allows suppression of false sensing of an object due to influence of temperature change while allowing object sensing using an indirect wave in the region less likely to cause false sensing with the temperature change.

This embodiment is configured to detect the predetermined temperature change state on the basis of the outdoor temperature θ detected by the vehicle-mounted outdoor temperature sensor 32. Such a configuration allows a temperature closer to the vehicle 30 and the ambient temperature of the vehicle 30 to be obtained with high accuracy. Accordingly, it is possible to preferably suppress false sensing occurring due to influence of the temperature change around the vehicle.

The setting switch 33 is provided as a signal input unit in which an operator inputs a control signal whether or not to perform the sensing suppression control and is configured to allow customization by the operator whether or not to perform the sensing suppression control. Whether or not false sensing due to an indirect wave is prone to occur tends to depend on the environment where the vehicle 30 is located. Thus, such a configuration allows object sensing by limiting use of an indirect wave if necessary in accordance with the geographic area and the situation of use by a user, such as frequent cold district driving, while effectively using an indirect wave if they are not necessary in accordance with the user and the driving environment.

Second Embodiment

The second embodiment will now be described mainly on the differences from the first embodiment. The first embodiment is configured to perform, when the predetermined temperature change state is detected, control not to sense an object using an indirect wave as the sensing suppression control in some region. In contrast, in the present embodiment, when the predetermined temperature change state is detected, control to make it difficult to sense the object using an indirect wave is performed as the sensing suppression control. Particularly in the present embodiment, the threshold used to sense an object using the indirect wave is altered to make it difficult to sense an object, thereby making it difficult to sense the object using the indirect wave.

FIG. 7 is a flowchart illustrating a processing procedure of the sensing suppression control in the present embodiment. In the description for FIG. 7, descriptions on the process same as that in FIGS. 5 and 6 are omitted by giving the step numbers in FIGS. 5 and 6. In FIG. 7, at steps S41 and S42, the process same as that at steps S31 and S32 in FIG. 6 is executed. If the received wave is a direct wave, the process continues to step S43 to determine whether or not the amplitude of the direct wave is a first threshold Vth1 or more. If the amplitude of the direct wave is the first threshold Vth1 or more, the process continues to step S45 to execute, at steps S45 to S47, the process at steps S23 to S25 in FIG. 5.

In contrast, if the received wave is determined as an indirect wave at step S42, the process continues on to step S44. At step S44, the threshold of the amplitude is defined as a second threshold Vth2 and whether or not the amplitude of the indirect wave is the second threshold Vth2 or more is determined. The second threshold Vth2 is set as a value to make it more difficult to sense an object than the first threshold Vth1, that is, a value greater than the first threshold Vth1. If the amplitude of the indirect wave is the second threshold Vth2 or more, the process continues to step S45 to increment the sensing number N. If the amplitude of the indirect wave is less than the second threshold Vth2, the process continues to step S46 to compare the sensing number N with the determination value without performing the increment.

The second embodiment described in detail above is configured to allow alteration of the threshold used to sense an object using an indirect wave to make it difficult to sense the object, thereby making it difficult to sense the object using the indirect wave. This allows suppression of false sensing of an object due to influence of the temperature change.

Third Embodiment

Next, the third embodiment will be described mainly on the differences from the first embodiment. The first embodiment is configured to detect the predetermined temperature change state using the outdoor temperature θ detected by the vehicle-mounted outdoor temperature sensor 32. In contrast, in the present embodiment, the predetermined temperature change state is detected using the outdoor temperature θ detected by the vehicle-mounted outdoor temperature sensor 32 and a vehicle surrounding environment recognized by the vehicle-mounted cameras 25.

That is, it is considered that a location where temperature change is likely to occur around the vehicle and the outdoor temperature θ is actually varying has a higher probability of causing false sensing due to an indirect wave. In view of such a point, when the predetermined temperature change state is detected from the outdoor temperature θ detected by the vehicle-mounted outdoor temperature sensor 32 and the vehicle surrounding environment recognized by the vehicle-mounted cameras 25, object sensing by the indirect wave is limited to suppress false sensing of an object while minimizing limitation of the object sensing by the indirect wave.

Figure 8:
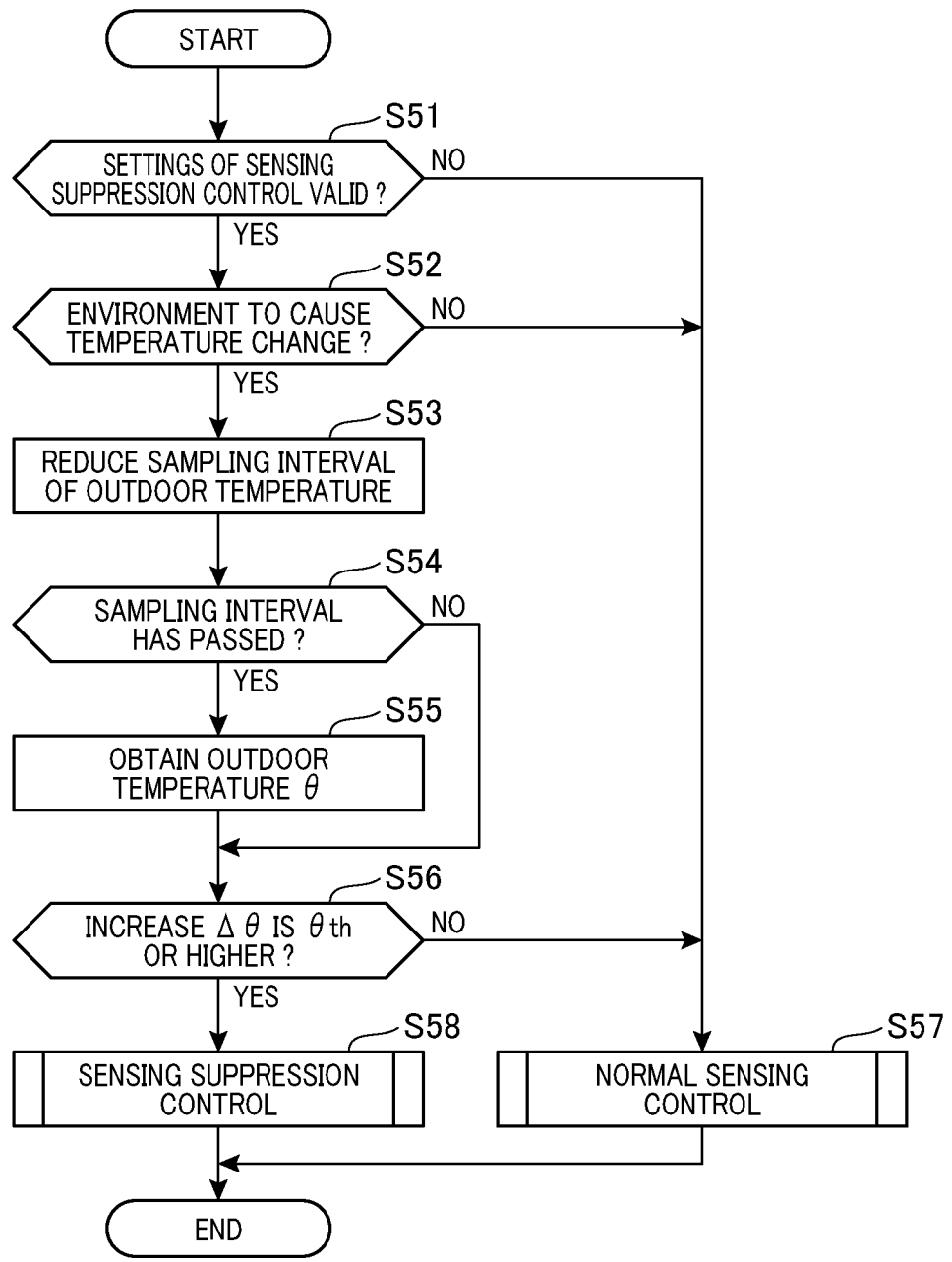
FIG. 8 is a flowchart illustrating a processing procedure of object sensing control in a third embodiment.

FIG. 8 is a flowchart illustrating a processing procedure of the object sensing control in the present embodiment. This process is executed by the ECU 10 for each predetermined cycle. In the description for FIG. 8, descriptions on the process same as that in FIG. 4 are omitted by giving the step numbers in FIG. 4.

In FIG. 8, at step S51, whether or not the settings of the sensing suppression control are valid is determined. If the settings of the sensing suppression control are valid, the process continues to step S52 to determine whether or not there is a possibility of temperature change of a predetermined temperature or more occurring in the temperature around the vehicle 30 on the basis of an image taken by the vehicle-mounted camera 25. In this situation, whether or not the vehicle 30 is in a state of entering a structure having an internal space (e.g., a garage, a tunnel, an indoor parking lot, etc.) is determined from the image taken by the vehicle-mounted camera 25.

If the situation is determined to have a possibility that the temperature change of the predetermined temperature or more occurs on the basis of the taken image, the process continues to step S53 to reduce the sampling interval of the outdoor temperature θ detected by the outdoor temperature sensor 32. Specifically, the sampling interval of the outdoor temperature θ is altered from a normal interval ta when the sensing suppression control is not performed to an interval tb shorter than ta. At steps S54 to S58 after that, the process at steps S12 to S16 in FIG. 4 is executed.

According to the third embodiment described above, the sensing suppression control is performed in a location where temperature change is likely to occur around the vehicle and the outdoor temperature θ is actually varying, it is possible to suppress false sensing of an object while minimizing limitation of the object sensing by the indirect wave. This allows object sensing actively using an indirect wave in a situation where false sensing arising from temperature change is less likely to occur.

When the situation is determined to have a possibility of causing temperature change of a predetermined temperature or more on the basis of the taken image, this embodiment is configured to reduce the sampling interval of the outdoor temperature θ, thereby allowing accurate sensing of the temperature change around the vehicle. This allows an increase in determination precision of whether or not the situation around the vehicle is the predetermined temperature change state.

Other Embodiments

The present disclosure is not limited to the above embodiments, and for example, may be performed as follows.

The first embodiment is configured not to sense an object using an indirect wave only in a near-vehicle region in a predetermined distance from the vehicle 30 when the predetermined temperature change state is detected, but it is noted that the present disclosure is not limited to the foregoing structure. In the present disclosure, not only some region but the entire region may be configured not to sense an object using an indirect wave. Specifically, in the sensing suppression control in FIG. 6, when the received wave is determined as an indirect wave at step S32, the present routine is configured to be ended without performing the process at step S33. In addition, the second embodiment may be configured to make it difficult to sense an object using an indirect wave only in the near-vehicle region within a predetermined distance from the vehicle 30.

In the above embodiments, the determination is made that the vehicle 30 is surrounded by the predetermined temperature change state using a detected value of the vehicle-mounted outdoor temperature sensor 32, but it is noted that the present disclosure is not limited to the foregoing structure. In the present disclosure, the determination may be made using a detected value of an outdoor temperature sensor outside the vehicle. Specifically, the determination may be made on the basis of outdoor temperature information received as a detected value of an outdoor temperature sensor installed in a tunnel, an indoor parking lot, or the like by communication.

The determination may be made that the vehicle 30 is surrounded by the predetermined temperature change state on the basis of a plurality of outdoor temperature information items. Such a configuration allows each temperature sensors to complement the vulnerabilities of each other to increase the temperature detection accuracy. For example, a difference between an outdoor temperature sensor built in the ultrasonic sensor 20 and an outdoor temperature sensor in a tunnel may be obtained to determine that, when the difference is a threshold or more, temperature change of a predetermined temperature or more has occurred or may occur in the temperature around the vehicle 30.

The second embodiment is configured to alter the threshold used to sense an object using an indirect wave to make it difficult to sense the object, thereby making it difficult to sense the object using the indirect wave. In the present disclosure, the modes of making it difficult to sense the object using the indirect wave are not limited to this. For example, when the amplitude of a reflected wave is determined as the threshold Vth or more, the value to increase the sensing number N may be configured to be differentiated between a direct wave and an indirect wave to make it difficult to sense the object using the indirect wave. Specifically, when the amplitude of the reflected wave is determined as the threshold Vth or more, the sensing number N may be configured to be increased by $\alpha$ (e.g., by 1) for a direct wave whereas the sensing number N may be increased by a number smaller than $\alpha$ (e.g., by 0.5) for an indirect wave.

As another configuration to make it difficult to sense the object using the indirect wave, the sensing suppression control may be configured to perform control to define the determination value to finalize that there is an object to be greater than that in the normal sensing control. This allows reduction in the influence of receiving an indirect wave. Instead of the configuration where the threshold Vth of the amplitude is variable, the amplitude of the indirect wave may be configured to be corrected to be smaller to make it difficult to sense the object using the indirect wave.

The detection may be made that the vehicle 30 is surrounded by the predetermined temperature change state not using the outdoor temperature sensor but only by an environment recognition apparatus to recognize the surrounding environment of the vehicle 30. Specifically, an image taken by the vehicle-mounted camera 25 is obtained to determine, from the image thus obtained, whether or not there is an environment where temperature change of a predetermined value or more occurs in the ambient temperature of the vehicle 30, more specifically, whether or not the vehicle 30 is in a state of entering a structure having an internal space. In this case, when the vehicle is determined to be in the state of entering a structure having an internal space, determination is made as a state having a possibility that temperature change of a predetermined value or more occurs in the ambient temperature of the vehicle.

The third embodiment is configured to reduce the sampling interval of the outdoor temperature θ when the state is determined to have a possibility that temperature change of a predetermined value or more occurs in the ambient temperature of the vehicle on the basis of the taken image, whereas the sampling interval may be configured not to be altered.

The environment recognition apparatus to recognize the surrounding environment of the vehicle 30 is not limited to the vehicle-mounted cameras 25 and may be configured, for example, to recognize the surrounding environment of the vehicle 30 on the basis of positional information obtained from a vehicle-mounted navigation apparatus.

The above embodiments describe the case of providing the ultrasonic sensors 20 at the front and the rear of the vehicle 30, whereas the positions to attach the sensors are not limited to these and may be, for example, provided in the left side and the right side of the vehicle 30 instead of or in addition to the front and the rear of the vehicle 30. In addition, the number of the ultrasonic sensors 20 to be attached is not particularly limited.

The above embodiments are described using the object sensing apparatus mounted to a vehicle as an example, whereas the apparatus may be mounted to a moving object, such as a railway vehicle, a vessel, an aircraft, and a robot, for example.

Each component described above is conceptual and not limited to the above embodiments. For example, a function belonging to one component may be achieved by dividing into a plurality of components or a function belonging to a plurality of components may be achieved by one component.

Although the present disclosure is described in accordance with embodiments, the present disclosure is understood not to be limited to the embodiments or the structures. The present disclosure includes various modifications and alterations within equivalents. In addition, various combinations and modes, and even other combinations and modes including only one component or more or less are within the scope and the spirit of the present disclosure.

The invention claimed is:

1. An object sensing apparatus applicable to a moving object including a plurality of ultrasonic sensors to transmit a probing wave and to receive a reflected wave of the probing wave, comprising:
   an object sensing unit to sense the moving object using a direct wave, being a reflected wave received by a sensor having transmitted the probing wave among the plurality of ultrasonic sensors, and an indirect wave, being a reflected wave received by a sensor different from the sensor having transmitted the probing wave among the plurality of ultrasonic sensors; and
   a temperature change detection unit to detect a predetermined temperature change state where a temperature change of a predetermined value or more has occurred or a possibility of the temperature change occurs in an ambient temperature of the moving object, wherein
   the object sensing unit performs, when the predetermined temperature change state is detected by the temperature change detection unit, sensing suppression control not to sense the moving object using the indirect wave or to make it difficult to sense the moving object using the indirect wave.

2. The object sensing apparatus according to claim 1, wherein
   the object sensing unit performs the sensing suppression control in terms of a short distance region from the moving object to a predetermined distance.

3. The object sensing apparatus according to claim 1, wherein
   the moving object is provided with a temperature sensor to detect the ambient temperature of the moving object, and
   the temperature change detection unit detects the predetermined temperature change state on the basis of a temperature detected by the temperature sensor.

4. The object sensing apparatus according to claim 1, wherein
   an environment recognition apparatus to recognize a surrounding environment of the moving object is mounted to the moving object, and
   the temperature change detection unit detects the predetermined temperature change state on the basis of a surrounding environment recognized by the environment recognition apparatus.

5. The object sensing apparatus according to claim 4, wherein
   the moving object is provided with a temperature sensor to detect the ambient temperature of the moving object, and
   the temperature change detection unit detects the predetermined temperature change state on the basis of a temperature detected by the temperature sensor and a surrounding environment recognized by the environment recognition apparatus.

6. The object sensing apparatus according to claim 1, comprising
   a signal input unit in which an operator inputs a control signal whether or not to perform the sensing suppression control, wherein
   the object sensing unit performs the sensing suppression control on the basis of the control signal from the signal input unit.

7. An object sensing method, applicable to a moving object including a plurality of ultrasonic sensors to transmit a probing wave and to receive a reflected wave of the probing wave, comprising:
   sensing the moving object using a direct wave, being a reflected wave received by a sensor having transmitted the probing wave among the plurality of ultrasonic sensors, and an indirect wave, being a reflected wave received by a sensor different from the sensor having transmitted the probing wave among the plurality of ultrasonic sensors; and
   in the sensing, when a predetermined temperature change state is detected where a temperature change of a predetermined value or more has occurred or a possibility of the temperature change occurs in an ambient temperature of the moving object, not sensing the moving object using the indirect wave or making it difficult to sense the moving object using the indirect wave.

* * * * *